United States Patent [19]

Kisselmann et al.

[15] 3,637,286
[45] Jan. 25, 1972

[54] INDICATING INSTRUMENT FOR VISUAL READING

[72] Inventors: Willy Kisselmann, Grunwald near Munich; Fritz Rümpelein, Munich; Paul Kopf, Unterhaching near Munich, all of Germany

[73] Assignee: AGFA-Gevaert Aktiengesellschaft, Leverkusen, Germany

[22] Filed: Mar. 20, 1970

[21] Appl. No.: 21,416

[30] Foreign Application Priority Data

Mar. 24, 1969  Germany .................. P 19 14 947.4

[52] U.S. Cl. .................. 350/112, 116/129 R, 324/154 PB, 350/110, 350/113
[51] Int. Cl. .................................................. G02b 27/02
[58] Field of Search .................. 350/110–116; 116/129 C, 129 E; 324/154 PB

[56] References Cited

UNITED STATES PATENTS 1,088,897  3/1914  Gyr ........................... 350/112
3,523,516  8/1970  Speaker ....................... 350/110
2,761,056  11/1956  Lazo ........................... 350/112

FOREIGN PATENTS OR APPLICATIONS 477,781  1/1938  Great Britain ................. 350/112

Primary Examiner—David Schonberg
Assistant Examiner—Paul R. Miller
Attorney—Michael S. Striker

[57] ABSTRACT

An indicating instrument for visual reading includes a flat housing and at least one elongated straight scale extending along a narrow front side of the housing. A moving-coil instrument in the housing has a pointer whose tip is located in a plane making a right angle with the pointer axis and an acute angle with the front side of the housing. The tip is movable along the front side behind an elongated light-transmitting prism which permits direct observation of a portion of the tip and is provided with a mirrored surface which reflects the image of the tip toward the front side of the housing. An opaque edge face of the prism separates the reflected image from the directly observable portion of the tip.

26 Claims, 7 Drawing Figures

INVENTOR.
WILLY KISSELMANN
FRITZ RÜMPELEIN
PAUL KOPF

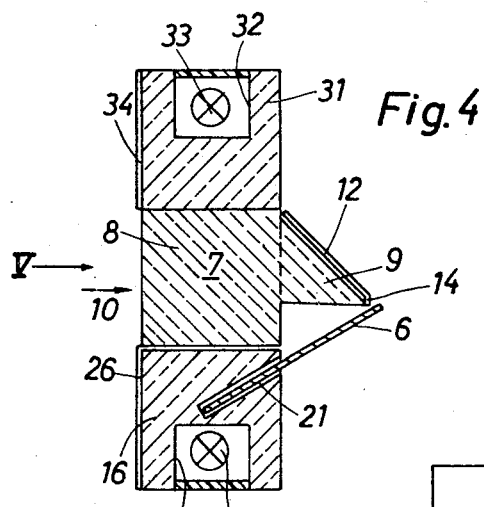
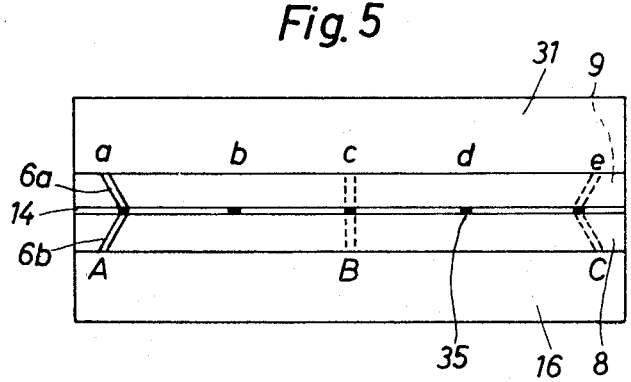
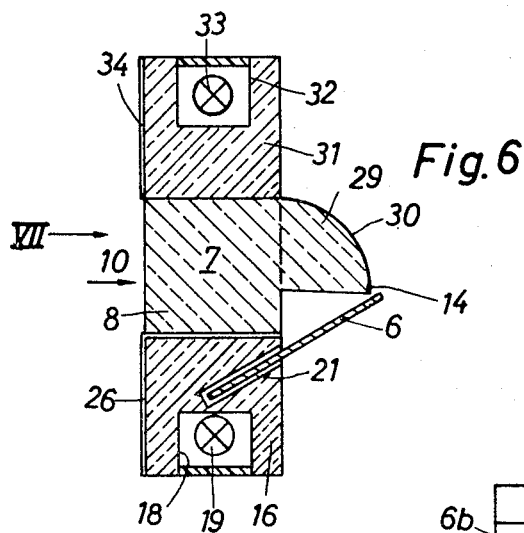
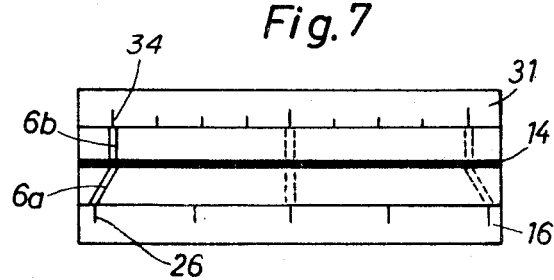
INVENTOR.
WILLY KISSELMANN
FRITZ RÜMPELEIN
PAUL KOPF

INDICATING INSTRUMENT FOR VISUAL READING

BACKGROUND OF THE INVENTION

The present invention relates to indicating instruments in general, and more particularly to improvements in instruments wherein a pointer travels with reference to a scale whose graduations indicate various sizes, frequencies or other values.

An indicating instrument which comprises a galvanometer or the like normally employs an arcuate scale along which the tip of the pointer of the galvanometer travels into registry with various graduations. Such indicating instruments are not suited for use in certain apparatus, for example, in those wherein the readings should be furnished by a pointer which moves along a straight scale. Certain radio receivers, such as those used in automotive vehicles, must be provided with indicating instruments wherein the readings should be furnished by one or more straight scales.

SUMMARY OF THE INVENTION

An object of the invention is to provide an indicating instrument wherein the positions of a turnable pointer can be read on one or more straight scales, wherein the scale or scales can be placed at a desired distance from the axis of the pointer, and wherein the positioning of the scale or scales is largely independent of the exact inclination of the pointer axis.

Another object os the invention is to provide an indicating instrument wherein the position of the pointer is clearly readable on several scales each of which may have its graduations distributed in a similar or in a different way.

A further object of the invention is to provide a simple, rugged and inexpensive indicating instrument which occupies little room, which can utilize a flat housing, and which is susceptible of mass production for use as a prefabricated block in a variety of apparatus to indicate frequencies, voltages, current intensities and/or other values.

Still another object of the invention is to provide the instrument with novel means for permitting direct as well as indirect observation of the turnable pointer.

The indicating instrument of our invention comprises a preferably flat block-shaped housing having an elongated front side which is exposed for observation when the housing is installed in an electrical apparatus (such as a radio receiver in an automotive vehicle), a meter (e.g., a moving coil instrument) installed in the housing and having a pointer turnable about a fixed axis and including an end portion movable along a path extending along the front side of the housing and located in a plane which is normal to the axis of rotation of the pointer and makes an oblique (preferably acute) angle with the front side of the housing, an elongated at least substantially straight scale adjacent to the path of the end portion at the front side of the housing, and a light-transmitting prism adjacent to the plane at one side of the end portion of the pointer and having two mutually inclined surfaces one of which faces toward and the other of which faces away from the plane. The two surfaces meet along an edge portion of the prism and such edge portion is closely (preferably immediately) adjacent to the plane of the pointer end portion. The other surface of the prism is arranged to reflect the image of the end portion toward the front side of the housing and at least a part of such end portion is observable directly through the prism from the front side of the housing, i.e., the end portion of the pointer can be seen directly as well as in reflection, and the "real" and reflected images of the end portion travel along the graduations of the scale when the pointer turns about its axis.

The scale is preferably provided on an elongated carrier which serves as a guide for the outermost part of the end portion of the pointer, as a means for obscuring such part of the end portion to thereby at least reduce its visibility from the front side of the housing, and preferably also as a means for supporting or accommodating one or more light sources which illuminate the pointer and/or the scale. The carrier preferably consists of light-diffusing material.

The novel features which are considered as characteristic of the invention are set forth in particular in the appended claims. The improved indicating instrument itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a fragmentary central longitudinal vertical sectional view of a second indicating instrument;

FIG. 5 is a smaller-scale front elevational view as seen in the direction of arrow V in FIG. 4;

FIG. 6 is a fragmentary central longitudinal vertical sectional view of a third indicating instrument; and FIG. 7 is a smaller-scale front elevational view as seen in the direction of arrow VII in FIG. 6.

DESCRIPTION OF THE PREFERRED EMBODIMENTS

Figure 1:
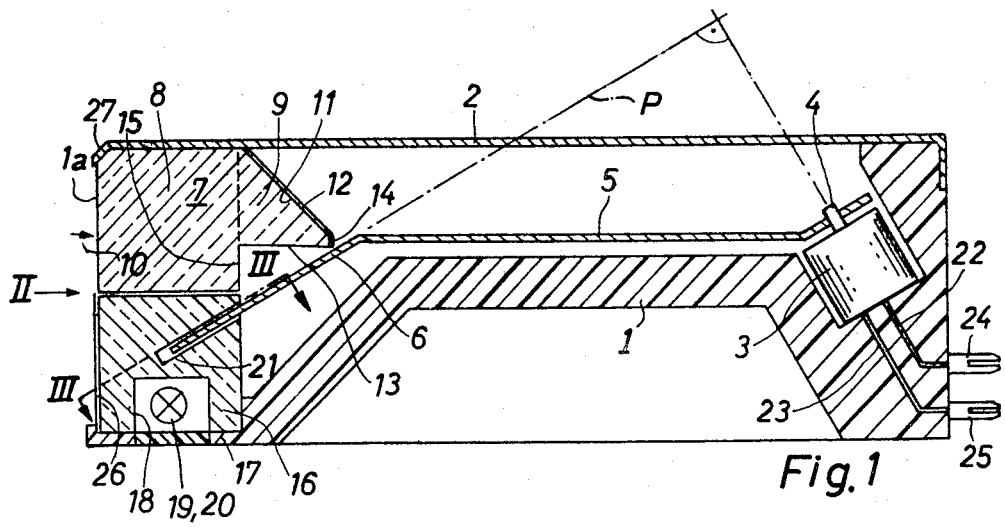
FIG. 1 is a central longitudinal vertical sectional view of an indicating instrument which embodies one form of the invention.
Figure 2:
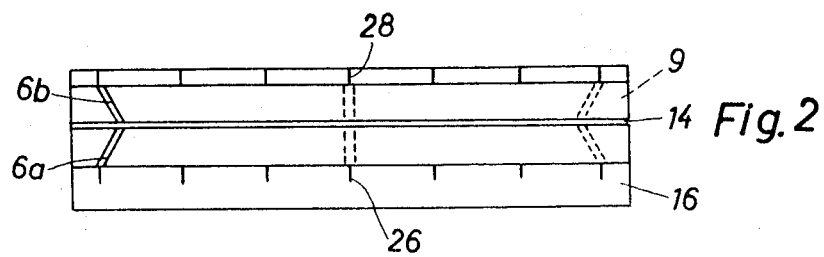
FIG. 2 is a smaller-scale front elevational view of a portion of the instrument as seen in the direction of arrow II in FIG. 1.
Figure 3:
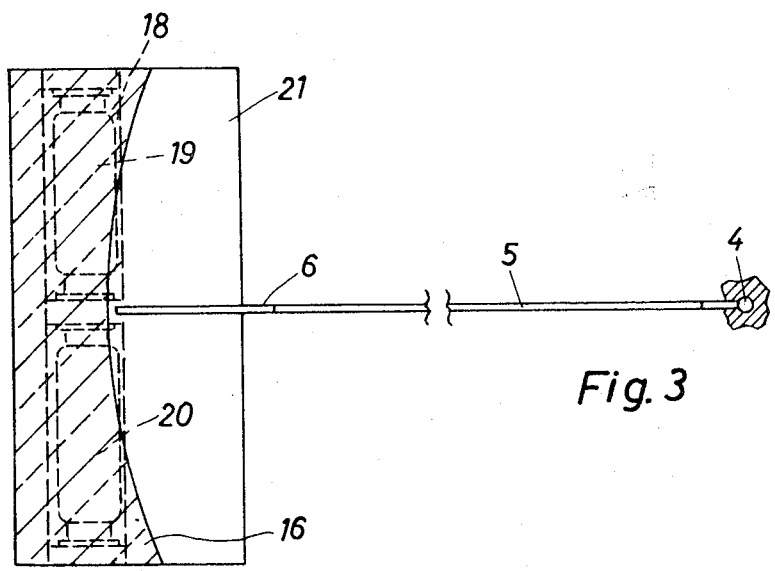
FIG 3 is an enlarged fragmentary sectional view as seen in the direction of arrows from the line III—III of FIG. 1.

Referring first to FIGS. 1 to 3, there is shown an indicating instrument which comprises a housing having a base portion 1 and a cover portion or top 2. The housing forms a block which can be built into a radio receiver or another apparatus so that its left-hand side or front side 1a remains at least partly exposed for reading of a straight elongated scale 26.

The base portion 1 is provided with a recess for the casing of an electrical measuring instrument 3 (hereinafter called meter for short) which can constitute a galvanometer and has a rotary output shaft 4 which makes an oblique (acute) angle with the front side 1a of the housing and carries an elongated pointer or needle 5 including an end portion or tip 6 which is located in a plane P making a right angle with the axis of the shaft 4 and an acute angle with the front side 1a of the housing. Thus, when the needle 5 is caused to turn in response to angular displacement of the shaft 4, the tip 6 remains in the plane P and travels along the front side 1a of the housing. The latter further accommodates an elongated light-transmitting prism 7 having a main portion 8 of square cross-sectional outline and a second portion or extension 9 of generally triangular cross-sectional outline. One surface of the main portion 8 forms part of the front side 1a of the instrument housing. The prism 7 is adjacent to the upper side of the tip 6. That surface (11) of the extension 9 which faces away from the front side 1a and away from the upper side of the tip 6 is flat and is coated with a layer 12 of light-reflecting material so that it constitutes a mirror which reflects the image of the tip 6 toward the front side 1a of the housing, i.e., into the eye of a person looking in the direction indicated by the arrow 10. A second surface 13 of the extension 9, which faces the upper side of the tip 6, makes with the surface 11 an acute angle and is located in a plane which is parallel to the direction indicated by arrow 10, i.e., normal to the front side 1a. The meeting edge of the surfaces 11, 13 is chamfered, as at 14, and is coated with opaque material (e.g. with black paint) to prevent optical shifting of the image of the tip 6. The width of the chamfered edge face 14 is less if the tip 6 is nearer to such edge face, and vice versa. The width of the gap between the edge face 14 and the tip 6 is constant in all angular positions of the pointer 5.

The height of that surface (15) of the main portion 8 which is adjacent and extends at right angles to the surface 13 of the extension 9 is selected in such a way that the height of the tip portion which is observable through the main portion 8 below the extension 9 at least approximates the height of the image of that portion of the tip 6 which is reflected by the layer 12 on the surface 11 (see FIG. 2).

An elongated scale carrier or guide 16 of light-diffusing material is adjacent to the front side 1a of the instrument housing below the main portion 8 of the prism 7 and its outer surface carries the aforementioned straight scale 26. The carrier 16 has a square cross-sectional outline and its bottom surface 17, which is adjacent to the underside of the housing, is provided with a longitudinally extending recess or chamber 18 for two coaxial light sources 19, 20, e.g., small electric lamps which are installed therein in suitable sockets indicated in FIG. 3. The inner surface of the carrier 16 is formed with an elongated groove 21 which receives and conceals the foremost or outermost part of the tip 6. The groove 21 is located in the plane P.

The conductors 22, 23 for the meter 3 are connected to terminals 24, 25 which form a male coupling member or plug and can be inserted into a socket when the housing is properly installed in a radio receiver or the like. Similar or analogous coupling members (not shown) are provided for the light sources 19 and 20.

As shown in FIG. 2, the straight scale 26 extends substantially along the full length of the front surface of the carrier 16. The cover portion 2 includes a suitably bent front marginal portion 27 which carries a second scale 28 (see FIG. 2) whose graduations register with those of the scale 26. The numeral 6a denotes in FIG. 2 the "real" image of that portion of the tip 6 which is directly observable by looking through the lower part of the main prism portion 8. The indirect image of that portion of the tip 6 which is reflected by the layer 12 on the surface 11 and is visible at the front side 1a of the instrument is indicated at 6b. When the pointer 5 is out of central position, the images 6a, 6b of the tip 6 are inclined with reference to the plane of the edge face 14 and respectively register with the graduations of the scales 26 and 28. Such images are inclined outwardly, i.e., from the plane of the edge face 14 toward the nearest sides of the instrument housing. In the central position of the pointer 5, the image 6a is in line with the image 6b. When the pointer 5 is in motion, the images 6a, 6b resemble a strip or band which travels in a plane extending in parallelism with the front side 1a of the housing. Such band is V-shaped when the pointer 5 leaves its central position. Since the legs of the band extend outwardly, the scales 26, 28 can extend all the way or very close to the lateral sides of the housing. If desired, the graduations of the scale 26 can be made longer to extend along the upper surface of the carrier 16 (below the main portion 8 of the prism 7).

FIG. 3 shows that the light sources 19, 20 extend in parallelism with the front side 1a of the housing. The innermost part of the groove 21 is bounded by an arcuate surface whose radius is selected in such a way that the outermost part of the tip 6 remains in the groove in each of the two end positions of the pointer 5.

If the tip 6 is bent upwardly rather than downwardly, as viewed in FIG. 1, the carrier 16 is placed above the prism 7, i.e., the extension 9 is then located below the plane P.

The feature that the tip 6 is inclined with reference to the remaining portion of the pointer 5 renders it possible to accommodate all components in a relatively flat housing. An advantage of the extension 9 (whose height, as considered at right angles to the longitudinal direction of the scale 26 or 28, is less than the height of the main portion 8) is that the observer can see a "real" image (6a) and a reflected image (6b) of the tip 6 and that such images are separated from each other by the edge face 14 so that the observer is not readily confused even if the distribution and/or other characteristics of graduations on the scale 26 are different from those of graduations on the scale 28. The two scales can be placed close to each other which is important when the instrument is used in compact electrical apparatus, such as radio receivers which are installed in or on the dashboards of automotive vehicles.

The main portion 8 constitutes an optional part of the prism 7. Its function is to reduce the optical distance between the image 6a and the front side 1a.

The carrier 16 obscures the outermost part of the tip 6 to at least reduce its visibility at the front side 1a of the housing. The light sources 19, 20 illuminate the tip 6 and also the scale 26 on the carrier 16. Each of these light sources may include a light-diffusing envelope.

FIGS. 4 and 5 illustrate a portion of a second indicating instrument which comprises a second light-dispersing carrier 31, similar to the carrier 16, disposed above the prism 7. The upper surface of the carrier 31 is formed with an elongated chamber or recess 32 for one or more light sources 33. The front surface of the carrier 31 is provided with a scale 34 which replaces the scale 28 of FIGS. 1 and 2. The distribution of graduations (a-e) on the scale 34 is different from that of graduations (A-C) on the scale 26 of the carrier 16. FIG. 5 shows that the edge face 14 is also provided with a scale 35. The graduations of the scales 26, 34 and 35 can indicate various frequencies or the symbols representing various radio stations. For example, the graduations of the scale 26 can be used for coarse adjustment and the graduations of the scales 34, 35 can be used for precision adjustment (such as tuning in or radio stations). The graduations of the scale 35 are simple strips or notches in the edge face 14. This scale is of advantage if the graduations on the scale 26 and/or 34 constitute numerals, letters or like symbols.

The instrument shown in FIGS. 6 and 7 is similar to the instrument of FIGS. 4-5 excepting that the substantially triangular extension 9 is replaced with an extension 29 having a convex mirrored surface 30. The curvature of the surface 30 is selected in such a way that the reflected image 6b of the tip 6 is always vertical (see FIG. 7) irrespective of the angular position of the pointer 5 (not shown). The inclination of the image 6a changes in the same way as described in connection with FIG. 2. An advantage of the convex surface 30 is that the two images 6a, 6b of the tip 6 facilitate ready discrimination between the scale 26 (on the guide 16) and the scale 34 (on the carrier 31).

If desired, the light source 33 in the carrier 31 or the light sources 19, 20 in the carrier 16 can be turned off at the will of the operator, for example, when the operator is interested only in the readings along the scale on the carrier 16 or on the carrier 31. It is further clear that the improved instrument is susceptible of many additional modifications. For example, the surface 15 of the main prism portion 8 can be configurated in such a way that the inclination of the image 6a remains unchanged in each angular position of the pointer 5. Also, the carrier 31 may accommodate several light sources and the carrier 16 may accommodate a single light source or more than two light sources. The extension 9 or 29 can be integral with or it may be glued or otherwise attached to the main portion 8.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the claims.

What is claimed as new and desired to be protected by Letters Patent is set forth in the appended claims.

1. An indicating instrument, comprising a housing having a front side; a meter mounted in said housing and having a pointer turnable about a predetermined axis, said pointer including a first portion and an end portion which is inclined with reference to said first portion and is movable along said front side of said housing, said end portion being located in a plane which makes an oblique angle with said front side and is normal to said axis; an elongated at least substantially straight scale adjacent to said path at the front side of said housing; and a light-transmitting prism adjacent to said plane at one side of said end portion and having a plurality of surfaces including two mutually inclined surfaces one of which faces toward and the other of which faces away from said plane, said mutually inclined surfaces making an acute angle and meeting along an edge portion which is closely adjacent to said plane, said one surface making with said plane an acute angle and said other surface being arranged to reflect the image of said end portion toward said front side of said housing, at least a part of said end portion being observable directly through said prism from said front side by looking in a direction which is at least substantially parallel to said one surface.

2. An instrument as defined in claim 1, wherein said one surface of said prism is located in a plane which is substantially normal to the front side of said housing.

3. An instrument as defined in claim 1, wherein said other surface of said prism is flat.

4. An instrument as defined in claim 1, wherein said other surface of said prism is curved in such a way that the orientation of the reflected image of said end portion remains unchanged in all angular positions of said pointer.

5. An instrument as defined in claim 1, wherein said edge portion of said prism is provided with an elongated face coated with a layer of opaque material.

6. An instrument as defined in claim 5, further comprising a second elongated scale having graduations provided on said face of said edge portion.

7. An instrument as defined in claim 1, wherein said prism includes a portion of substantially triangular cross-sectional outline and wherein said surfaces are provided on such portion of said prism.

8. An instrument as defined in claim 1, wherein said prism includes a main portion adjacent to the front side of said housing and having a rectangular cross-sectional outline, and an extension of substantially triangular cross-sectional outline, said surfaces being provided on said extension.

9. An instrument as defined in claim 8, wherein said extension is attached to said main portion.

10. An instrument as defined in claim 8, wherein said main portion of said prism has a square cross-sectional outline.

11. An instrument as defined in claim 8, wherein said main portion has a surface which is adjacent to said one side of said end portion and is located in a plane disposed at right angles to the plane of said one surface on said extension.

12. An instrument as defined in claim 8, wherein the height of said main portion, as considered at right angles to the longitudinal direction of said scale, exceeds the height of said extension.

13. An instrument as defined in claim 1, wherein said end portion includes a part which is remotest from said axis and further comprising means for obscuring said part to at least reduce its visibility from the front side of said housing.

14. An instrument as defined in claim 13, wherein said means for obscuring comprises an elongated guide of rectangular cross-sectional outline, said guide being adjacent to said front side and having an elongated groove located in said plane and accommodating said part of said end portion.

15. An instrument as defined in claim 13, wherein said means for obscuring constitutes a carrier for said scale.

16. An instrument as defined in claim 15, wherein said carrier is adjacent to one side of said prism.

17. An instrument as defined in claim 16, further comprising a second elongated straight scale provided on a second carrier located at the other side of said prism.

18. An instrument as defined in claim 17, wherein the distribution of graduations of one of said scales is different from the distribution of graduations on the other scale.

19. An instrument as defined in claim 1, further including at least one source of light arranged to illuminate said end portion and said scale.

20. An instrument as defined in claim 19, wherein said source includes at least one lamp and means for diffusing the light issuing from said lamp.

21. An instrument as defined in claim 20, wherein said means for diffusing comprises an elongated carrier for said scale and wherein said lamp is accommodated in said carrier.

22. An instrument as defined in claim 21, wherein said carrier includes a groove located in said plane and accommodating that part of said end portion which is remotest from said axis, said carrier being arranged to at least obscure the visibility of such part of said end portion at the front side of said housing.

23. An instrument as defined in claim 1, wherein said axis is inclined with reference to the front side of said housing.

24. An instrument as defined in claim 1, wherein said housing constitutes a prefabricated block which is insertable into electrical or like apparatus and includes at least one coupling portion accessible at the exterior of said housing.

25. An instrument as defined in claim 24, wherein said coupling portion is an electric plug.

26. An instrument as defined in claim 1, wherein said housing has an underside and further comprising an elongated carrier adjacent to said front side and supporting said scale, said carrier having a surface adjacent to the underside of said housing and provided with a recess extending lengthwise of said front side, and at least one light source provided in said recess and arranged to illuminate said scale and said end portion of said pointer.

* * * * *